A. L. SOHM.
RECORDING SYSTEM AND APPARATUS.
APPLICATION FILED JULY 17, 1911.
1,075,608.
Patented Oct. 14, 1913.
5 SHEETS—SHEET 3.
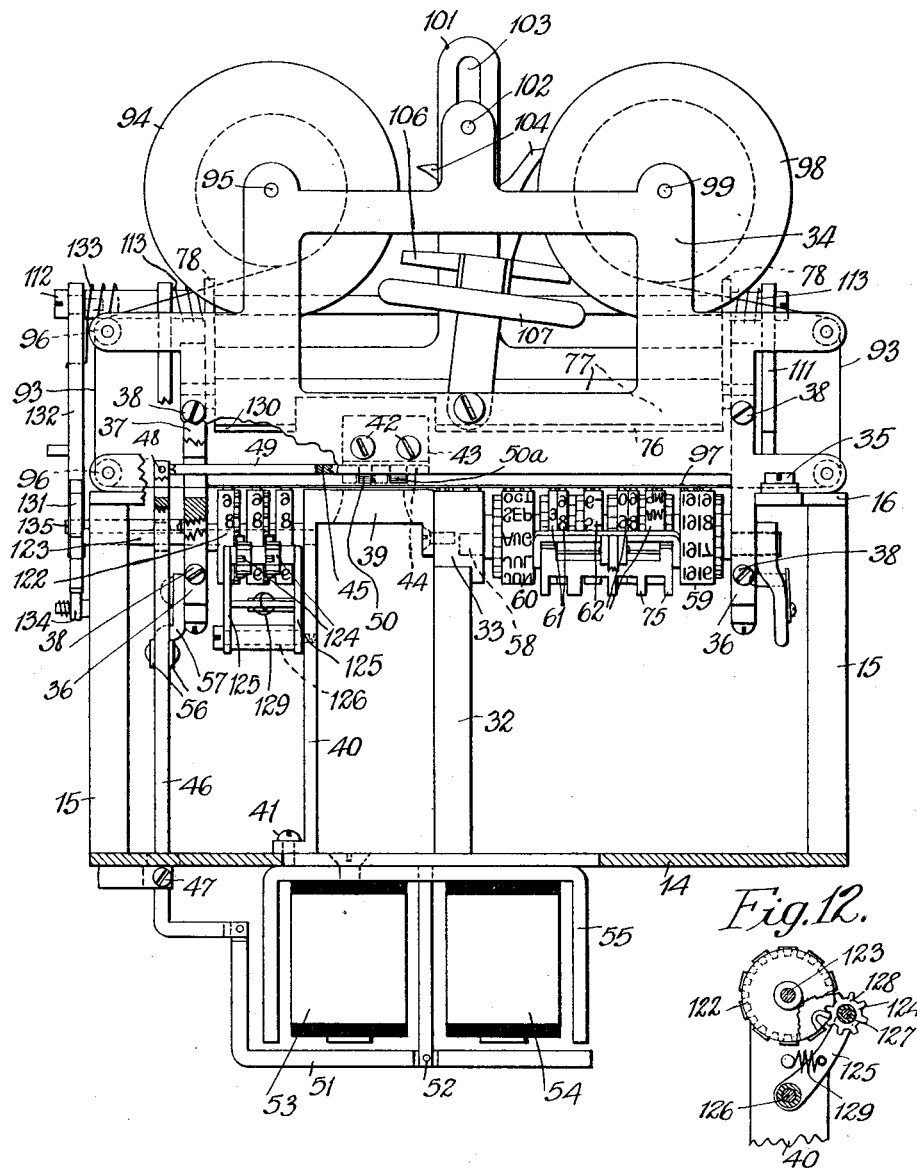
Witnesses:
Leonard W. Novander
Robert T. Bracke
Inventor
Alfred L. Sohm
By Brown Williams
Attorneys

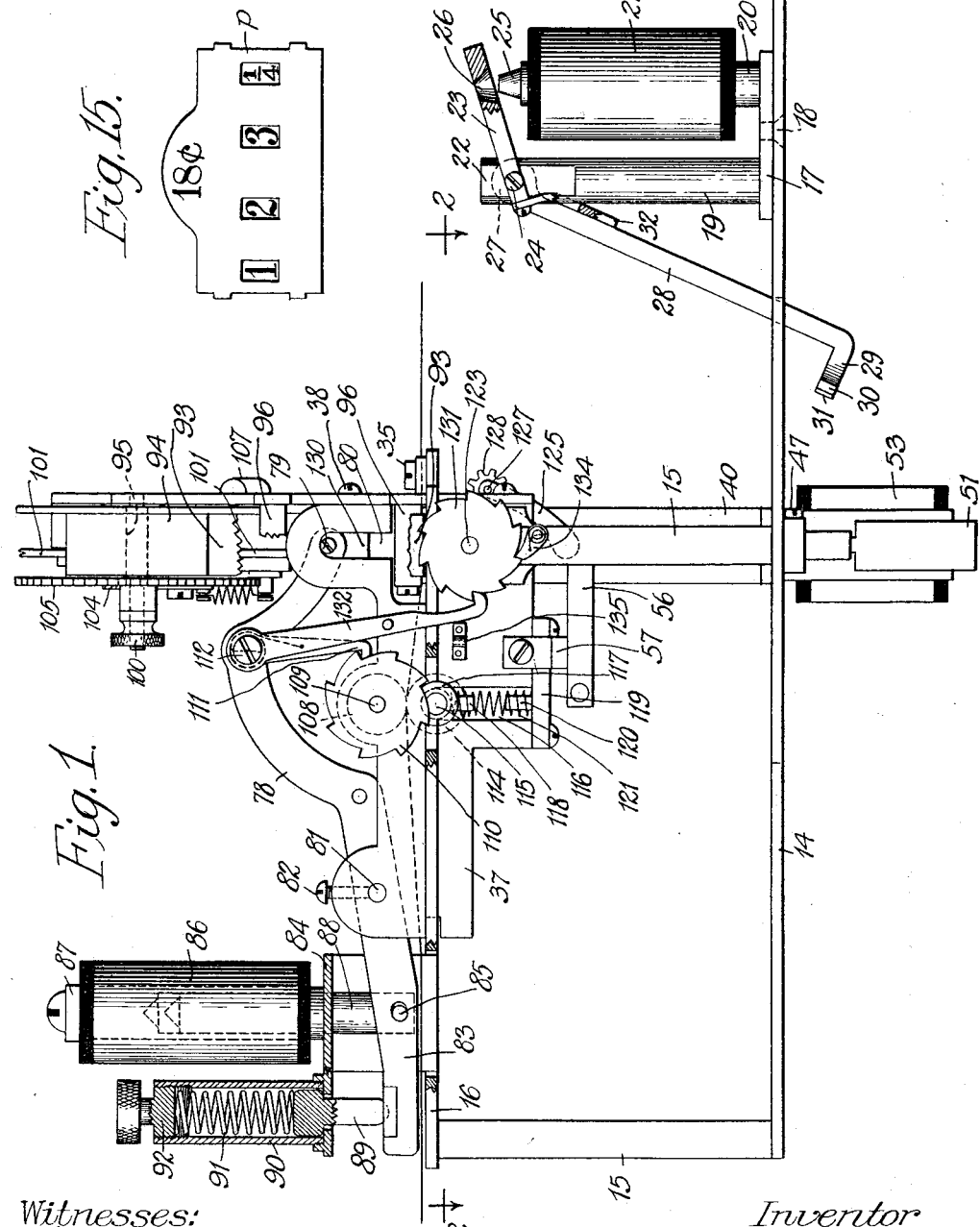

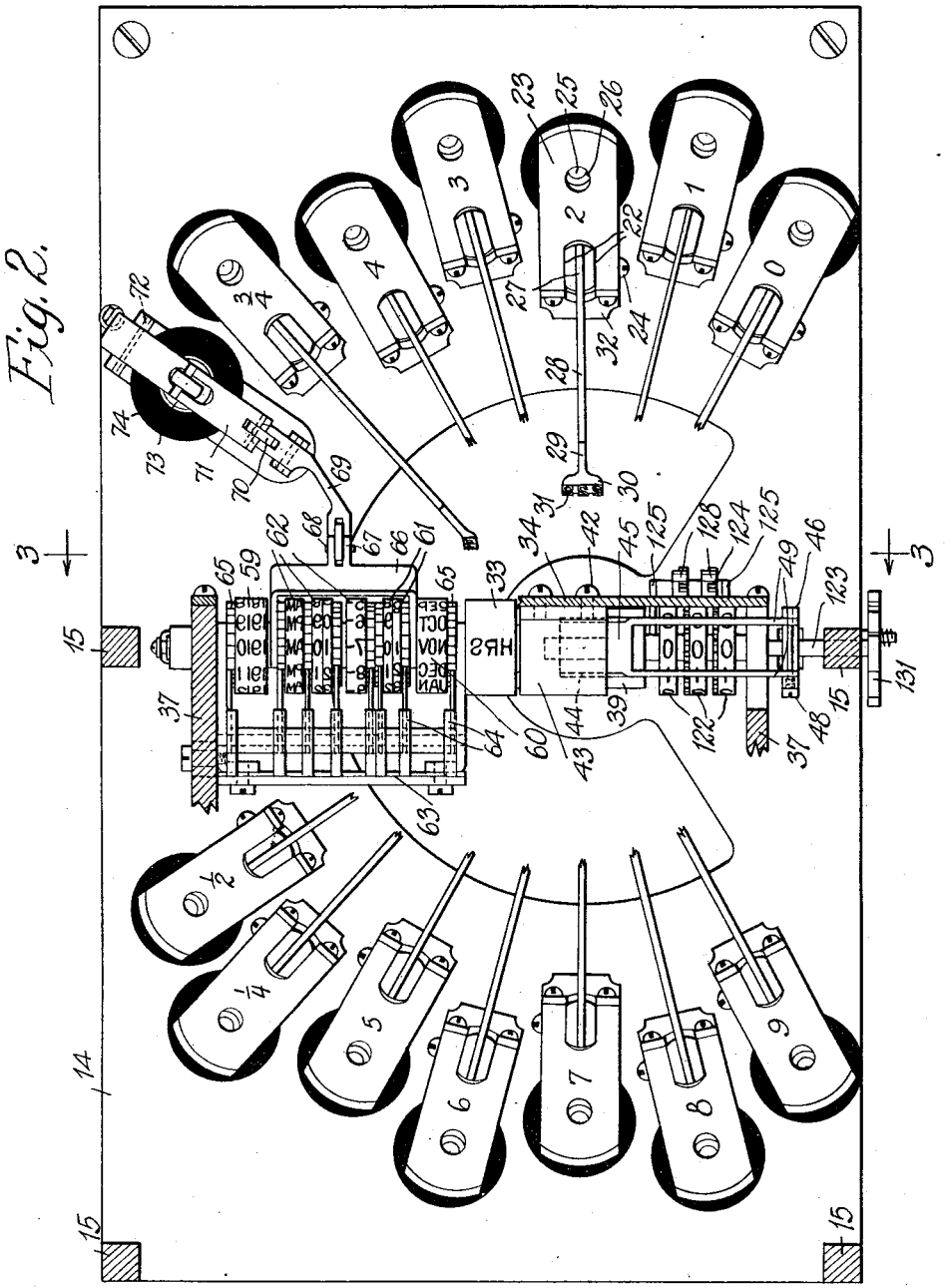

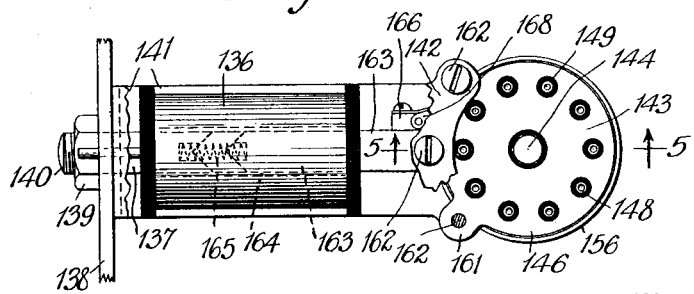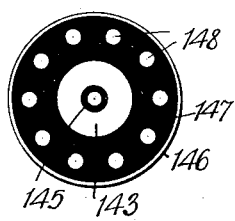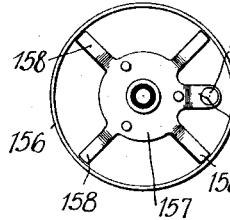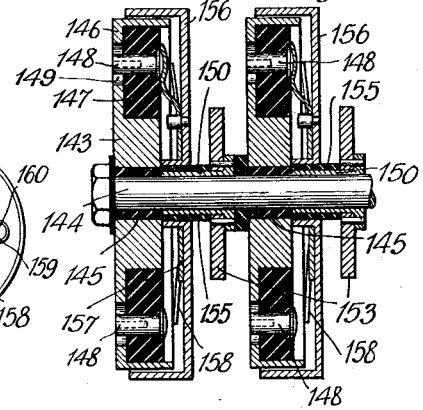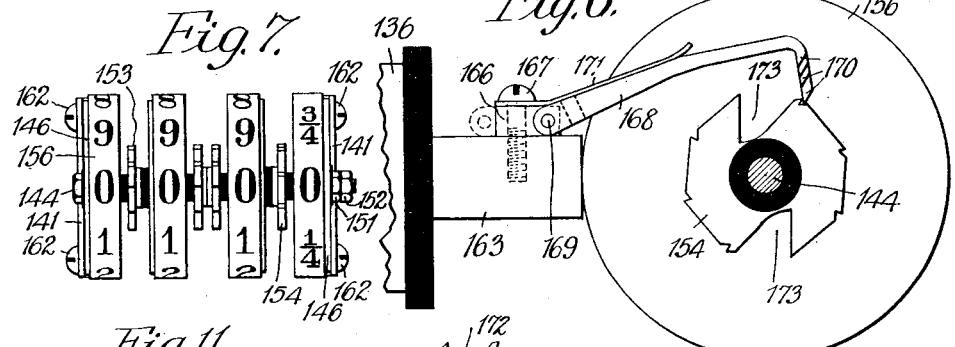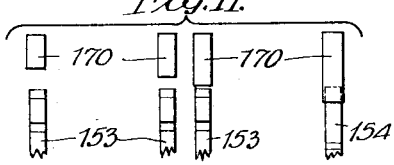

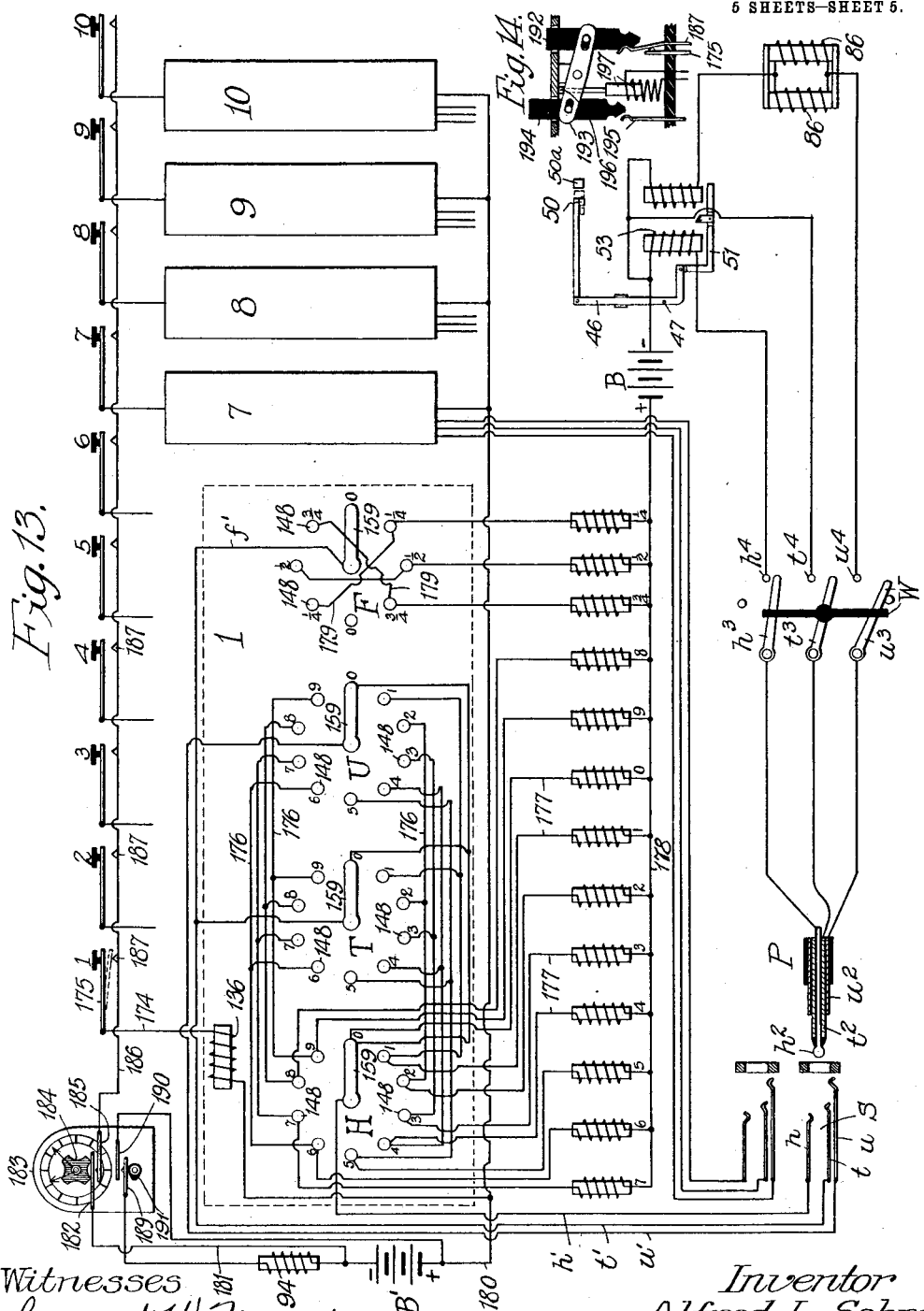

UNITED STATES PATENT OFFICE.

ALFRED L. SOHM, OF LOS ANGELES, CALIFORNIA, ASSIGNOR TO SOHM ELECTRIC SIGNAL & RECORDING COMPANY, OF CHICAGO, ILLINOIS, A CORPORATION OF ARIZONA.

RECORDING SYSTEM AND APPARATUS.

1,075,608.  Specification of Letters Patent.  Patented Oct. 14, 1913.

Application filed July 17, 1911. Serial No. 638,866.

*To all whom it may concern:*

Be it known that I, ALFRED L. SOHM, a citizen of the United States, residing at Los Angeles, in the county of Los Angeles and State of California, have invented a certain new and useful Improvement in Recording Systems and Apparatus, of which the following is a full, clear, concise, and exact description, reference being had to the accompanying drawings, forming a part of this specification.

My invention relates to the art of automatic recording and contemplates an improved system and apparatus for making a record of periods of elapsed time. Thus, while it may be found that my invention is applicable for other purposes, I contemplate particularly its use as a means for keeping track of the working time of employees in large industrial establishments. It will be seen that the refinements of the system and apparatus of my invention are directed toward this use.

It is usual in large industrial establishments to provide means whereby a record of the working time of each employee may be made by requiring the employees to register the beginning times and the ending times of their respective working periods. This is usually done by requiring each employee to register, each time that he enters and leaves the premises, upon a time clock or "in and out" device, as it is often called. Such operations, in industrial parlance, are called "punching the clock" and the practice has become one of almost universal employment.

The system and apparatus of my invention is an electrical system which is controlled by physical manipulation, like that required in the "in and out" devices mentioned in the preceding paragraph, but it is productive of an entirely new result in that it accumulates the remunerative time of all the employees at work. In other words, it does not result merely in a record of the starting and ending times of all the working periods, which system leaves the necessity of computation, but it adds or integrates the working periods so that the ultimate result is an indication and record of the entire remunerative time expended.

In my copending applications, Serial No. 556,628, filed April 20, 1910, Serial No. 574,000, filed July 26, 1910, and Serial No. 603,621, filed January 20, 1911, I set forth electric systems which broadly comprise a so-called "entrance plate" and a recording machine which may be located at a remote point. The two instruments are connected by wires and each employee upon coming to work makes the registration of his appearance by manipulating certain switches on the entrance plate, and upon leaving he registers his departure in the same manner. By these operations a permanent record is produced in the recording machine and at the end of each week or month, or other period when the payroll is made up, the bookkeeper makes up the per diem wages with the aid of the record thus obtained.

In my present system I provide an entrance plate, with electric switches, to be manipulated by the employees; a plurality of accumulators which integrate the working times of the various employees; and a recording machine which is adapted for association with any of the accumulators, so that a record of the time accumulated may be made. Broadly, the result secured is this: Whenever the employee goes to work he operates a switch. Whenever he stops work he operates a switch. During the time that he is working the accumulator with which he is identified integrates the time. The recording machine may be connected with an accumulator to make a permanent record of the integration up to that point. Incidentally, I provide means whereby a visual indication is had at all times, although it will appear that this need not necessarily be employed to get the benefits of the system as a whole.

The accumulator is a special device and, in itself, it has novel and useful features which I make the subject-matter of some of the appended claims. The recording machine is of the general type illustrated and described in the copending applications referred to. It comprises a plurality of electromagnetic printing devices which are adapted to be actuated to print a column of figures, these figures, in the present instance, being the total number of hours as added together by the accumulator. In addition to these printing magnets, the recording machine comprises other printing mechanism—consecutive numbering mechanism and timing mechanism, the former of these for indicating the number of the employee and the latter for indicating the exact time at which each record is made. The paper advancing mechanism and the inking ribbon advancing mechanism are both automatically operated and this is consistent with my purpose in making as much as possible of the apparatus automatic in operation. The electric wiring which is required is simple and all the parts are of easy access so as to facilitate inspection and repair. The fact that the entrance plate need be the only part of the apparatus which is exposed to the employees is important, in that only authorized persons may have access to the parts which execute the record in response to the manipulations by the employees. Thus, the entrance plate may be located at the entrance to the industrial establishment and the other mechanisms may be located in the office under the surveillance of a time clerk. At all times the accumulated hours are visually indicated, and at such times when it is desired to make a permanent record of the accumulations the time clerk connects in the recording machine, quickly and in a simple manner, to secure the desired result.

My invention is illustrated in the accompanying drawings, in which—

Figure 1 is a side elevational view of the recording machine, parts being broken away, removed, and shown in section, to more clearly reveal the construction; Fig. 2 is a plan view of the recording machine taken on the plane of the line 2—2 of Fig. 1; Fig. 3 is an end elevational view taken on the plane of the line 3—3 of Fig. 2 and looking in the direction indicated by the arrows; Fig. 4 is a side elevational view of the accumulator, parts being broken away to more clearly reveal the construction; Fig. 5 is a partial diametrical sectional view taken on the plane of the line 5—5 of Fig. 4 and looking in the direction indicated by the arrows; Fig. 6 is a side elevational view of part of the accumulator mechanism; Fig. 7 is a front elevational view of the accumulator, the rear parts being removed to avoid confusion; Fig. 8 is a face view of one of the contact disks employed in the accumulator; Fig. 9 is a face view of one of the wiper disks employed in the accumulator; Fig. 10 is a face view of one of the ratchet wheels employed in the accumulator; Fig. 11 is a fragmentary view illustrating the relation between the pawls and ratchets in the accumulator; Fig. 12 is a fragmentary detailed view showing part of the consecutive numbering mechanism on the recording machine; Fig. 13 is a diagrammatic view illustrating the general system; Fig. 14 is a detail of the entrance plate switch; and Fig. 15 is a view of a face plate.

In the specific embodiment of my invention which I illustrate to instruct those skilled in the art, I employ the recording machine shown in Figs. 1, 2, 3 and 12, and I shall first describe the construction and operation of this particular apparatus.

The various parts are mounted upon a base-plate 14 which is provided with the four upright columns 15, 15 supporting the shelf 16, which, in turn, supports other operating parts. The electromagnetic printing devices, which are all substantially alike, are mounted directly upon this base-plate and are so distributed that the type bars which they actuate may come into proper relation to a "printing line" or "printing area" to be described later. Each of these printing electromagnets are constructed as follows: A base-plate 17 is secured to the base 14 by means of a screw 18, and this supplemental base is provided with the two upward extensions 19 and 20. The base 17 and the extensions are of magnetic material and this magnetic circuit is closed by the armature. The upward extension 20 is in the form of a cylindrical post which carries an energizing winding 21. The upward extension 19 is cylindrical except at the top where it has the flattened sides 22. The armature 23 is mounted upon the post 19, embracing that part of the post which has the flattened sides and being pivoted thereto by means of a pivoted member 24 extending inwardly. The top of the core 20 is provided with a central conical portion 25 which is adapted to enter a correspondingly shaped aperture 26 in the armature 23, when the armature is brought down to the core upon the energization of the winding. The top of the post 19 is bifurcated for the reception of the hub 27 of the type bar 28, which is mounted upon the pivoted member 24. The end of the type bar 28 is provided with a toe 29, which carries the type piece 30 having the three type 31, 31. The rear end of the armature is provided with a tail piece 32, extending downwardly therefrom and suitably cut out so as to embrace the post 19 more or less when the armature is in its raised position. With this arrangement of parts, the type bar 28 can rest down upon the tail piece, as shown in Fig. 1, and when the winding 21 is energized, the attraction of the armature will result in the raising of the tail piece and the consequent moving of the type bar. The type bar is loosely mounted relative to the member 24 and it follows that when the armature is suddenly attracted the transition of the movement from the tail piece to the type bar will be in the form of a kick or hammered blow, so that even when the movement of the tail piece would stop, by its striking the core 20, the type bar may continue upwardly into the printing line or area where it is arrested by the platen which will be referred to later.

The shelf 16 carries the time printing mechanism, the ribbon mechanism, the paper advancing mechanism, the consecutive numbering mechanism, and the platen mechanism. Possibly, it would simplify the description to say at the start that the printing line is approximately coincident with a line extending between the two right-hand posts 15, 15 (Fig. 3). Extending upwardly from the base-plate 14 between the right-hand posts 15, 15 is a post 32 (Fig. 3), which has secured thereon a head 33 for a purpose which will be pointed out presently.

At the right-hand end of the shelf 16 (Fig. 1) a vertical frame-plate 34 is mounted in place by means of screws 35, 35. This frame-plate has the downwardly extending supports 36, 36. The shelf 16 is broadly U-shaped, while the frame-plate 34 extends across the open end of the U, and on the inside of the U, on each side, a side-plate 37 is secured by means of screws 38, 38. These side plates aline and are secured to the supports 36, 36 to form a rigid structural support.

The framework carries a small box 39, which is mounted between the head 33 and a supporting strip 40 secured to the base by means of a screw 41. This box 39 is disposed just below the printing line, which is slightly above the top of the shelf 16, and its interior is flared downwardly to form guiding means for the type bars 28, 28. This box defines the printing area into which the type of the printing electromagnets are thrown, and it will be seen that the type pieces 30 of each of the type bars could be bent and set into any adjusted position so that they may be guided up into the printing line in the proper manner.

Above the box 39 the vertical frame-piece 34 has secured thereto, by means of screws 42, 42, a bracket 43. The under side of this bracket is provided with a dove-tailed slot 44, in which a slide piece 45 is mounted, this slide piece operating from side to side over the box 39 as is evident from Figs. 2 and 3. A shifting lever 46 is pivoted to the base 14 at 47, passing through a suitable opening in the base, and, at its upper end, is pivotally connected at 48 to the slide piece 45. The slide piece 45 is forked, as indicated at 49, for a purpose which will be pointed out later. The upper end of the shifting lever 46 is widened and is bifurcated for the reception of the side piece between the resulting tangs. Upon its under side, the slide piece is provided with a small platen 50, which is of a width approximately equal to the over-all width of one of the type of the type bar. As indicated in dotted lines in Fig. 3, it will be seen, that by movement of the slide piece 45, the platen 50 is adapted to occupy three positions, such positions being in regular side by side order over the box 39.

The shifting lever 46 extends downwardly from its pivot 47 where it is pivotally connected with the oscillating armature 51, pivoted at 52 between two electromagnets 53 and 54, mounted upon a frame-piece 55 secured to the under side of the base. The linkages which have been described all aline so that when the armature 51 is in its normal position, the platen 50 will occupy the central position relative to the printing area over the box 39. The parts are normally held in this neutral position by means of a pair of leaf springs 56, 56 which extend from a bracket 57 secured to the framework, as best shown in Figs. 1 and 3. The two springs normally neutralize each other, so that the shifting lever 46 is held in a central position and so that, consequently, the armature 51 is held in a position where it is subject to movement by the energization of either of the electromagnets. When the magnet 53 is energized, the platen 50 occupies the left-hand position (Fig. 3), and when the magnet 54 is energized it occupies the right-hand position. One of these abnormal positions is the "units" position, and the other the "hundreds" position, as will be pointed out later. The platen normally remains in the "tens" position. A stationary platen 50ᵃ is carried by the bracket 43 for the fraction type bars.

As before stated, the numbers which are printed by means of the printing electromagnets represent the number of hours integrated by any particular accumulator. Since the head 33 is next to the box 39 in the printing line, it is conveniently provided with the notation "HRS.". A shaft 58 extends between the head 33 and the downward projection 36 on the right-hand side (Fig. 3). The axis of this shaft lies in the vertical plane of the printing line, and the various type wheels for printing the year, the month, the day of the month, and the time of the day, are mounted upon this shaft. This arrangement is clearly shown in Figs. 2 and 3, where the year wheel is shown at 59, the month wheel at 60, the day wheels at 61, 61, and the hour wheels at 62, 62. The particular construction here employed forms no part of my present invention and I shall, therefore, refer to the elements of this device merely broadly. A framework 63 is mounted in place in some suitable manner, through the medium of the shaft and the right-hand side plate 37, and this framework carries a number of spring pawl sets 64, 64, which engage with suitable ratchets 65, 65 on the shaft 58 in order to prevent under and over throw. The year wheel 59 and the month wheel 60 are adapted to be set manually, while the other wheels are operated electrically in a manner to be described presently. These other wheels are interconnected in a suitable manner, and, in the present instance, are adapted to show the time at minute intervals. When twelve hours have passed the indications are changed from "AM" to "PM", or vice versa, and when twenty-four hours have passed the day is changed. These interconnected parts are operated by an oscillating yoke 66 which is mounted upon the shaft 58, and which itself is actuated by the mechanism shown in Fig. 2. The yoke 66 is provided with a bifurcated lug 67 to which is pivoted at 68 a link 69, which hangs downwardly and is connected by means of a loose link 70 with a rocking lever 71 pivoted at 72. This rocking lever is actuated by means of a magnetic core 73, which is mounted in position to be influenced by a solenoid winding 74. Whenever the solenoid winding is energized the core 73 is drawn downwardly and with it the rocking member 71. This brings down the yoke 66, which carries a plurality of actuating pawls 75, 75, a sufficient distance so that the pawls may be advanced to catch upon succeeding teeth on the ratchets with which they are associated. When the energization ceases, a spring (not shown) under the core 73, is free to operate and the time wheels are rotated by the action of the spring.

The platen for the time wheels described in the preceding paragraph and the type notation "HRS" is illustrated at 76. This platen, of course, lies in the vertical plane of the "printing line" and is adapted to be lowered when the impression is to be made. This platen, and an auxiliary platen to be described later, are adapted to occupy that part of the "printing line" not already occupied by the laterally sliding platen 50. The platen 76 is carried in a box 77 which, in turn, is carried upon an oscillating frame 78 by means of trunnions 79. Each of these trunnions extends into a slot 80 in the respective side plate 37, and the proper movement of the platen is thus assured. The frame 78 is mounted upon a pivot rod 81 held in place in the side plates 37, 37 by means of side screws 82. The frame 78 has a tail part 83 which passes under a bridge 84 mounted upon the shelf 16. A rod 85 passes across the sides of this tail part and is loosely connected therewith, as indicated in Fig. 1. Mounted upon the bridge 84 are the operating electromagnets 86, the cores of which are joined by a yoke 87. Each of these cores has a hollow portion for the reception of a solenoid armature 88, which passes downwardly through the bridge and is connected with the rod 85, as shown. A plunger 89 has a head portion which is confined in a housing 90, and this plunger engages the end of the tail piece 83. A coiled spring 91 is disposed in the housing between the head of the plunger and a cap screw 92, which is adjustable so as to adjust the tension of the spring. Thus, the forward end of the oscillating frame is normally held in a raised position, and it is by the energization of the operating electromagnet that the platens are brought down upon the line of type in a manner to be described later.

The inking is secured by means of a ribbon 93. One end of the ribbon is secured to and is rolled upon a spool 94, pivoted at 95, in the upright frame-piece 34. The ribbon then passes over suitably mounted idlers 96, 96, which guide the ribbon between the strip of paper 97, referred to later, and the type, to the other spool 98 pivoted at 99 to the frame-piece. The spools 94 and 98 are mounted substantially in the same vertical plane with the printing line, and in this way the effective part of the ribbon is always kept in proper place. Each of the spools are retained upon their respective pivot pins by means of a thumb screw 100 which has threaded engagement with reduced end of the pivot pin, the screw being tightened up against the shoulder thus formed to leave the corresponding spool free to rotate. It is to be noted that the ribbon passes through the bifurcated upper end of the lever 46 and under the shifting platen collar 45.

The platen box 77, which is operated up and down by means of electromagnets 86, has extending upwardly therefrom a strap 101, which is guided relative to the upright frame by means of a pin 102 passing through an elongated slot 103 in the strap. My invention is not concerned with the particular arrangement for advancing the ribbon and I have, therefore, shown this mechanism merely generally. Suffice it to say that the strap 101 carries a pawl member 104 which is adapted to coöperate with ratchets 105 upon the ribbon spools. The member 106 is a retaining pawl member and the part 107 is some weight means to maintain the retaining pawl member in engagement with the "live" ratchet. Broadly stated, the arrangement is such that the pawl member, and the retaining pawl member, remain in coöperation with one of the rolls to draw the ribbon thereon until the limit of the ribbon has been reached when the next oscillation of the frame will cause the pawl members to jump to the other side to coöperate with the other roll member and to draw the ribbon over in the opposite direction.

The strip of paper 97, upon which the records are made, passes lengthwise of the machine between the ribbon and the platens. The paper is in the form of a strip and may be fed from a suitable roller and drawn through the machine in the manner to be described presently. After being put in the machine it may be torn off at suitable intervals if desired. The mechanism for causing the travel of the paper is as follows: Mounted between the side plates 37, 37, just in back of the platens, is a roller 108, this roller having trunnions 109 passing through the side plates. On each of these trunnions, beyond the side plates, is a ratchet wheel 110 which is adapted to be engaged by a dog 111 pivoted at 112 to the oscillating frame 78, a spring 113 being provided to hold this dog in engagement with the ratchet. The throw of the oscillating frame is such as to secure the movement of the dog through a distance slightly more than the length of one of the teeth of the ratchet, and the teeth of the ratchet are of such length that the periodic movement of a strip of paper rolling on the roller 108 will be ample to move the printed line on the strip entirely out of the range of the so-called "printing line" or "printing area." The roller 108 has associated therewith a second roller 114 mounted upon trunnions 115 which, in turn, are mounted in slots 116 in the side plates 37. Each trunnion is provided with a collar 117 in which it bears. Each collar has the downwardly extending pin 118, and the block 119 secured to the under side of the side plate 37 is provided with an upwardly extending pin 120, and between these two points, a coiled spring 121 is disposed, these springs holding the lower roller in contact with the upper roller, and the paper strip 97 is fed between these rollers. As the oscillating frame actuates, the ratchets 110 are advanced and the paper is carried on through the machine.

Referring to Fig. 3, it will be seen that just to the left of the box 39 there is a plurality of number wheels 122 mounted side by side upon a shaft 123, suitably set between the supporting strip 40 and the column 15, the lever 46 having a clearance opening through which it passes. This arrangement is also shown in Figs. 2 and 12. The wheels 122, 122 constitute a consecutive numbering device and the three digits wheels are operably connected together by carry-over mechanism 124. With the nature of this consecutive numbering device my invention has nothing to do except in the manner in which it is operated and in the fact that the wheels may be released from operative connection with each other, so that the device may be set back to zero or any other number at any time. For the latter purpose I provide an arm member 125, pivoted to the supporting strip 40 at 126. This arm member carries the shaft 127 upon which the ratchets 128, 128 are disposed. These ratchets form part of the carry-over mechanism and they are held in engagement with the other ratchets by means of a spring 129. This is the normal position, but it will be clear that the arm member can be drawn down at any time to release the number wheels from it and from each other and to permit of their immediate adjustment. It is seen that these number wheels lie directly beneath the open part of the shifting member 45 and that the printing line of the wheels is completely exposed. A special platen 130, mounted in the platen box 77, quite in the same manner as is the platen 76, coöperates with these consecutive numbering wheels. The platen 130 is adapted to pass down between the tangs 49 of the bifurcated shifting piece 45 and to coöperate with the type on the wheels, as is clear from the drawings.

The shaft 123 is extended on the outside of the machine, where it has secured thereto a ratchet wheel 131. A pawl 132 is hung upon the pivot 112 on the oscillating frame 78 and coöperates with the ratchet 131, being held in engagement therewith by means of a spring 133, this spring being coiled around an extension of the pivot member quite in the same manner as is the spring 113, as shown in Fig. 3. A spring-pressed retaining pawl 134 is mounted upon the column 15. Each time that the oscillating frame comes down it moves the pawl 132 a sufficient distance to grasp the succeeding tooth of the ratchet 131, and upon the return of the frame under the influence of the magnet 91 the ratchet 131 is carried around and with it the proper parts of the consecutive numbering mechanism, so as to advance the last named in the proper manner. If it is desired to dispense with the use of this consecutive numbering mechanism the pawl 132 may be swung back on the other side of the spring lug 135 which is secured upon the corresponding side plate 37 in proper position. The spring 133 will not overcome the tension of this spring lug and the pawl may operate up and down upon the rear side of it with no effect. The circuit arrangement for the recording machine which has now been described fully will be explained when the complete system is taken up by reference to Fig. 13.

I shall now proceed to a detailed description of the structure of the accumulator. Each of these devices comprises integrating mechanism, electromagnetic means for advancing said mechanism, and contact mechanism. The integrating mechanism comprises a plurality of digits elements, and in the specific embodiment of my invention herein illustrated, it also comprises a fraction element. I have shown three digits elements, so that the total capacity of the accumulator herein shown is 999¾. Each element of the integrating mechanism has contact mechanism associated therewith, which contact mechanism controls the circuits of the printing magnets of the recording machine which has been described. The influential relation between these parts will more fully appear when the system as a whole is described.

As shown in Fig. 4, where one of the accumulators is shown, a solenoid winding 136 is supported upon a core piece 137 which may be mounted upon any suitable support 138 by means of a nut 139 threading upon the cylindrical end 140 thereof. A U-shaped supporting piece 141 is clamped between the main part of the core, which preferably is square, and the support 138, as clearly shown in the drawings. This support extends forwardly along both sides of the energizing winding and the forward ends of the sides thereof are each enlarged, as shown at 142, for a purpose which will be pointed out presently. A plurality of contact carrying disks 143, 143 are securely mounted upon a shaft 144, spools 145 of insulating material intervening so as to isolate these disks from each other. Each of these disks provides an annular cap 146 in which an annulus 147 of insulating material is securely disposed. Each annulus carries a series of contact pins 148, 148, arranged circularly and in regular order, these pins having their heads exposed to a wiper, which will be referred to later, and having their ends extending through enlarged openings 149 in the disk so as to be isolated electrically. In the case of the digits elements there are ten contacts in the series and in the case of the fraction element there are eight contacts. This arrangement is best shown in Figs. 4, 5 and 8.

As shown in Fig. 7, the elements of the integrating mechanism are mounted side by side upon the shaft 144 and it will be seen that they are spaced apart by means of sleeves 150, 150, which are rotatably mounted upon the shaft. The entire arrangement is held together by means of a nut 151 on the end of the shaft, the other end having a head. In order that the arrangement may be secure without being clamped too tightly together for operation, a lock nut 152 may be provided. Each of the sleeves 150 carries a ratchet wheel, those for the digits elements being illustrated at 153, 153 (Fig. 10) and that for the fraction element being illustrated at 154 (Fig. 6). A bushing 155 is mounted upon each of the sleeves 150 and a circular cap 156 is securely mounted over this bushing, the ratchet and the corresponding cap thus operating together. The inside of this cap is shown in Figs. 5 and 9, and it will be seen that it is there provided with a spider 157, this spider comprising the spring arms 158, 158, which ride upon the rim of the disk 143, and the wiper 159, which is cupped as indicated at 160 and which passes over and makes electrical engagement with the heads of the contact pins 148, 148. It will now be seen that the disks 143 are intended to remain stationary and that the caps 156 are intended to rotate over them. It will also be seen that as the cap rotates in this manner the wipers carried thereby will successively make engagement with protected contacts and will close certain circuits, as will be pointed out later. Two or more of the disks 143 are provided with ears 161, 161 through which connecting bolts 162, 162 pass, these bolts passing through registering openings in the enlarged ends 142 of the side pieces of the U-shaped supporting frame 141.

The solenoid winding 136 is provided with a movable core 163 which rides in a non-magnetic tube 164 on the outside of the core. The core is disposed against the tension of a coiled spring 165, backing up against the core 137, as shown in Fig. 4, and tending to hold the movable core in its outward position. In order to avoid turning about an axis, the core is preferably made square, as indicated. In Fig. 6 it will be seen that a pivot block 166 is secured upon the top of the front end of the core 163 by means of a screw 167 and upon this block a pawl member 168 is pivoted at 169. This pawl is constructed on the order of a fork having forked prongs, and the down-turned ends 170, 170 are of different lengths, as illustrated in Figs. 6 and 11. The purposes of this arrangement will appear presently. These pawls, which thus all operate together, coöperate with the ratchets 153 and 154 and a spring 171 tends to hold the pawl member in such operative relation. Each of the ratchets 153, except the hundreds ratchet, is provided with a notch 172 which is considerably deeper than any of the teeth. The ratchet 154 is provided with two diametrically opposite notches 173, 173. The longest pawl 170 coöperates with the fraction ratchet, the next shorter coöperates with the units ratchet, the next shorter coöperates with the tens ratchet, and the last coöperates with the hundreds ratchet. While the longest pawl 170 is in operative engagement with the regular teeth of the ratchet 154, the other pawls are held out of operative engagement with their ratchets, as illustrated in Fig. 11. When, however, the ratchet 154 has made a half-revolution, which completes the cycle of fractions, the longest pawl 170 drops in one or the other of the two notches 173 in this ratchet and the units pawl is brought into operative connection with the units ratchet. The next actuation of the armature core then advances the units wheel one step as well as the fraction wheel, and when the fraction wheel has made another half-revolution the units wheel has advanced another step. When the units wheel has made a complete revolution the second pawl 170 drops down into the notch in the units wheel and the third pawl comes down into operative relation with the tens wheel. When the tens wheel has made a complete revolution the third pawl drops down into the notch in that ratchet and the last pawl may come down into operative engagement with the hundreds ratchet. The throw of the pawl is long enough to catch one of the teeth on the eight-tooth ratchet and the others will line up. It is thus seen that if the winding 136 is energized every fifteen minutes, each quarter-hour will show on the integrating mechanism. As a matter of structure, there are two fraction cycles for each revolution of the fraction ratchet and it will be apparent that one-eighth hours could be registered without departing from the spirit of my invention. The peripheries of the caps 156, 156 are provided with the proper indications so that a visual indication may be had at all times. As they are rotated they bring the successive figures down into an exposed line, for instance, the zero line shown in Fig. 7, and in this way the desired result is obtained. For each four actuations of the fraction element the units element is operated. For each ten actuations of the units element the tens element is operated and for each ten actuations of the tens element the hundreds element is actuated. The slots 172 and 173 are so disposed that when a zero on the fraction element comes into view the units wheel will be operated, when a zero on the units wheel comes into view the tens element will be operated, and when a zero on the tens wheel comes into view the hundreds wheel will be operated. There are eight characters on the fraction element, "0," "1/4," "1/2," "3/4," each occurring twice and those alike being diametrically opposite. There are ten characters on each of the digits elements, from "0" to "9" inclusive. Thus, we have integrating mechanism with a capacity up to 1000 hours subject to operation at fifteen minutes intervals. It will be clear to those skilled in the art that the capacity and the periods of operation could be changed without departing from the spirit and scope of my invention.

I shall now describe my system by reference to Fig. 13, where the diagrammatic representation of parts already described have been provided with the corresponding reference characters. The rectangle shown in dotted lines incloses the diagrammatic representation of the accumulator which has just been described. As before stated, a certain accumulator is assigned to each workman and this particular accumulator is accumulator #1. There are as many of these accumulators as there are workmen, but for the purposes of illustration, I have diagrammatically indicated but four more, #7, #8, #9 and #10. One terminal of each accumulator winding 136 is connected by means of a conductor 174 with a switch key 175. I have shown ten of these switch keys, numbered from "1" to "10" inclusive, thus adapting the system to ten employees, and it will be understood that each of these switches is connected with the corresponding accumulator. It will be apparent to those skilled in the art that the system could be enlarged to take care of any number of employees without departing from the spirit and scope of my invention.

The four sets of contact pins 148, 148 are shown diagrammatically and are provided with numbers which indicate their relation to the integrating mechanism. It will be remembered that the wiper 159, in each case, passes over these contacts and successively grounds them to the associated disk and cap, which in turn are connected with other parts of the circuit, as will be described presently.

The contacts for the hundreds element of the integrating mechanism are shown at H, the contacts for the tens element are shown at T, the contacts for the units element are shown at U, and the contacts for the fraction element are shown at F. The corresponding contacts of the three digits elements are all connected together by means of conductors 176, 176 and, by means of conductors 177 are connected with the terminals of the corresponding printing electromagnets of the recording machine. Thus, contact #1 of the units element is connected with contact #1 of the tens element, with contact #1 of the hundreds element, and with one terminal of printing electromagnet #1. The other terminals of all these printing electromagnets 21 are connected to a common wire 178 which leads to the positive pole of a battery B. The wipers 159 of the three digits elements are connected with a spring jack S, the hundreds wiper being connected with a spring $h$, the tens wiper with a spring $t$, and the units wiper being connected with the spring $u$, all by means of the conductors $h'$, $t'$, and $u'$ respectively. This spring jack is adapted for coöperation with a three-contact plug having a tip contact $h^2$, the sleeve contact $t^2$, and the secondary sleeve contact $u^2$. These contacts are respectively connected with the switch arms $h^3$, $t^3$ and $u^3$ of a hand switch W for which the corresponding contacts $h^4$, $t^4$, and $u^4$ are provided. The contact $h^4$ is connected with one terminal of the winding 53, which has heretofore been described as part of the mechanism for shifting the platen 50, and the other terminal of this winding is connected with the negative pole of the battery B. The contact $t^4$ is connected directly with the negative pole of the battery B and the contact $u^4$ is connected with the winding 86, which has heretofore been referred to as the winding of the operating magnet, and with the winding 54, which also forms part of the mechanism for shifting the platen 50, the other terminal of this winding being connected to the negative pole of the battery B.

It will now be seen that when the plug is inserted in the spring jack the hundreds wiper is adapted to be connected with the battery through the hundreds shifting winding 53, the tens wiper is adapted to be connected to the battery, and the units wiper is adapted to be connected with the battery through the operating winding and the units shifting winding, all by the movement of the switch W. When this switch is moved from one limit of its movement to the other, between the two limiting pins, the contacts are arranged to be made successively, by reason of the angular offsets between the switch arms. In other words, when the switch is moved over, the contact $h^4$ is made first, then the contact $t^4$, and then the contact $u^4$.

It has been stated that the contact element of the integrating mechanism is provided with two contacts for controlling the circuit of each fraction printing magnet. The similar contacts are diametrically opposite, and as shown in Fig. 13, they are connected together by means of conductors 179. The contacts for each fraction are connected to one terminal of the corresponding fraction printing electromagnet and the other terminals of these electromagnets are all connected to the conductor 178. The wiper 159 of the fraction element is connected with the tens wire $t'$ by means of the wire $f'$, and it is thus clear that whenever the tens circuit is made the fraction circuit is also made.

It will be remembered that the wipers 159 are advanced by means of the actuations of the accumulator magnet, each step being such that the wiper is thrown from one contact directly on to the next. Thus, it will be seen that at all times each of the wipers is closing the circuit at that point through some particular printing electromagnet, electromagnet which controls the type bar corresponding to the number of the contact upon which the wiper rests. Thus, when the wiper 159 of the hundreds element rests upon the contact #1 the circuit is closed at that point through the magnet #1, and the same for the other contacts and the other integrating elements.

The free terminals of all the windings 136 in the system are connected together by means of the conductor 180 and to the positive pole of a battery B'. The other pole of this battery is connected, by means of a conductor 181, with a contact spring 182 located in a clock 183, the hour hand of which carries the contact maker 184. A spring 185 is associated with the spring 182, and the contact maker 184 is so formed that it forces the spring 182 over in contact with the spring 185 four times for each revolution of the hour hand. In other words, this contact is made every fifteen minutes. The spring 185 is connected with the common conductor 186, which has the contacts 187, 187 each associated with one of the switch keys 175. It is thus seen that when one or more of the switch keys 175 are depressed to close the circuit between the switch key and the common wire 186, the corresponding winding or windings 136 are energized periodically, in this particular instance, every fifteen minutes. It will be remembered that each energization of the winding 136 secures the advance of the fraction wiper one step and further that each four advances of the fraction wiper secures one advance of the units wiper, etc. The clock 183 is also provided with contact mechanism comprising the springs 189, 190 adapted to be closed together once a minute by means of the cam 191 connected with the second hand. The spring 189 is connected with one terminal of the winding 74, which has heretofore been described as the winding forming part of the time wheel advancing mechanism, and the other terminal of this winding is connected with the negative pole of the battery B'. The spring 190 is connected with the positive pole of the battery B', so it will be seen that the winding 74 is energized once a minute to secure the proper advance of the time wheels of the recording machine.

It will be kept in mind that the switches 175, 175 constitute the so-called "entrance plate" and that a switch is assigned to each employee. In Fig. 14, I have shown a detail of a switch which may be employed. The contact elements are shown at 175 and 187 and with them a plug 192 is associated. This plug is loosely carried upon an oscillating member 193 which, on its opposite side, has an opposing plug 194. Pressing one of these plugs opens the switch, and pressing the other closes it. The spring 195 is provided merely to determine the alternative position. A restoring rod 196 may be associated with the oscillating member 193 and this may be operated manually or by means of a solenoid arrangement 197. In fact, this solenoid may be controlled by the clock in such a way that all the switches will be restored at a certain time automatically regardless of any manual operation. The purpose of this will be explained later.

All the accumulators in the system are preferably arranged in one or more banks with the integrating mechanisms thereof clearly exposed to view so that the numbering on the peripheries of the caps 156, 156 will at all times form a visual indication. The spring jacks S, S are also arranged in banks, quite in the manner of a telephone switchboard, and the plugs which are associated therewith are normally out of contact. While only one plug is needed, several may be connected in parallel so as to be fortified against breaks or crosses in the flexible cord.

Under normal conditions, as the clock 183 operates, the electromagnet 74 is energized once every minute and the time wheels 65, 65 of the recording machine are regularly advanced. When an employee goes to work he closes the switch 175 which is assigned to him, and this immediately places the corresponding accumulator winding 136 in circuit with the battery and the contact mechanism 182, 185. As has been described, this contact is closed periodically, in the present case every fifteen minutes, and the associated integrating mechanism is thus advanced step by step while he is at work. At the same time that the integrating mechanism is advanced the contact mechanism is advanced and circuits are set up for certain of the printing electromagnets of the recording machine. These circuits, however, are normally open at the plug and jack contacts and at the switch W. This gradual advance of the accumulator mechanism goes on during all the time that the employee is at work, and when he leaves he opens the switch 175 and the accumulator ceases to operate. When he begins again he closes the switch and whenever he stops he opens it, etc. Each employee controls his own accumulator in this way and a record of the working time of each employee is thus secured. The entrance plate, comprising the switches 175, it is evident, may be located remotely from the other parts of the system, and these latter parts may be located in the office subject to the control and scrutiny of an authorized person. Any number of these accumulators may operate at the same time and all the records are thus kept simultaneously.

When it is desired to take a reading or to make a permanent record of the accumulated periods at any time, the plug P is inserted in any of the desired jacks and the switch W moved over. This will result in the energization of certain printing electromagnets which, by the action of the accumulating mechanism, have been set up in circuit, and the printing of the proper number of hours on the record sheet in the printing machine. It will be seen that when the plug P is inserted in a certain jack and the switch W moved over, the contact $h^3$, $h^4$ is first closed. The circuit is then established through the printing electromagnet corresponding in number to the contact number upon which the hundreds wiper is disposed, and through the shifting winding 53. This brings the platen 50 over into the hundreds position and, the printing electromagnet being energized, the type is thrown up and that particular number is printed in the hundreds column on the record sheet. As the movement of the switch W proceeds the contact $h^3$, $h^4$ is broken and the contact $t^3$, $t^4$ is made. It will be remembered that the printing of the tens does not require any shifting of the platen, in other words the platen in its normal position is in the tens column, and since no other but the printing electromagnet is in circuit at that time, it is convenient to print the fraction through the same circuit. Thus, when the contact $t^3$, $t^4$ is made the digits printing electromagnet which corresponds with the contact upon which the tens wiper is disposed is energized, and so is the fraction printing electromagnet which corresponds with the contact upon which the fraction wiper is found. It will be remembered that the fraction printing magnets coöperate with the stationary platen 50ª. The "0" contacts of the fraction element of the accumulator are dead contacts since if the time is on the even hour nothing whatever need be printed in the fraction column.

The continued movement of the switch W results in the breaking of the contact $t^3$, $t^4$ and in the making of the contact $u^3$, $u^4$. This closes the circuit through the printing electromagnet which corresponds with the contact upon which the units magnet is found, the operating magnet 86, and the shifting winding 54. The energization of the shifting winding brings the platen 50 over into the units column, and, the printing electromagnet being energized, the resulting figure is printed in the units column. At the same time the electromagnets 86 are energized and this brings down the oscillating frame 78 of the printing machine to print the time and also the number, if desired, and to advance the ribbon and the paper upon the return movement.

When it is desired to make up a payroll, say at the end of a regular working period, it is convenient to set the consecutive numbering mechanism 122 at the beginning and then to insert the plug P in the spring jacks consecutively and correspondingly, moving over the switch W, as has been described, while the plug is in each spring jack. In this way, one reading after another is secured and the consecutive numbering mechanism identifies the employees in accordance with their numbers on the entrance plate and the numbers of their accumulators. The readings may also be taken off the visual board. As shown in Fig. 15, I propose exhibiting the proper number line on the integrating mechanism through openings in a plate $p$ and to place the rate per hour on this plate. These plates are to be removable and interchangeable, so that a change in the rate of the particular accumulator could easily be made.

If it is desired to make a permanent record or take a reading at any intermediate time between the regular times for making up the payrolls, say for one or two employees, this may be done by inserting the plugs in the particular jacks and by dispensing with the use of the consecutive numbering mechanism. In fact, the pawl 132 may be normally kept out of engagement with the ratchet 131, so that the consecutive numbering mechanism may be brought into use only after it has been properly set and when it is of advantage to use it. If an individual reading is taken at any time, this mechanism can be set, in the manner hereinbefore pointed out, so that the particular employee's number may appear opposite the resulting entry.

In the way of a brief summary I shall describe the cycle of operations for a particular record: When employee #1 goes to work he presses key 175, #1, and immediately #1 is put in the control of the clock. When he quits work he opens the switch and takes the accumulator from the control of the clock and this goes on during the entire interval between the times when the payroll is made up. Suppose, for the purpose of illustration, that the payroll is made up once a month and that at the end of the month the visual integrating mechanism shows that employee #1 has worked 218¾ hours. At this time the hundreds wiper will be on contact #2, the tens wiper will be on contact #1, the units wiper will be on contact #8, and the fraction wiper will be on one of the 3/4 contacts. When it is desired to take a reading and to make a permanent record of the time thus accumulated, the plug P is inserted in jack #1 and the switch W is moved over. First, the printing electromagnet #2 will be energized and will print "2" in the hundreds column; then printing electromagnet #1 and fraction printing magnet 3/4 will be energized, the former printing a "1" in the tens column and the latter printing a "3/4" in the fraction column. Finally, the printing electromagnet #8 is energized to print "8" in the units column, and at the same time the operating mechanism prints the time, the notation "HRS.," and, if the consecutive numbering mechanism has been initially set, they will operate to print "1" in the employee's number column—as follows:

1  218-3/4 HRS.  JUN 30  10 09 AM  1911.

I claim as new and desire to secure by Letters Patent:

1. In a recording system, a magnetically operated integrating device comprising a plurality of digits members, contact mechanism for each digits member of said integrating device, a printing machine comprising a plurality of electromagnetic devices each having an actuating type bar, and circuits for said electromagnetic devices controlled by said contact mechanism.

2. In a recording system, a plurality of printing electromagnets, contact mechanism arranged to shift the connections of the circuits of each electromagnet to the next, and time controlled means for operating said contact mechanism.

3. In a recording system, a plurality of printing electromagnets, a plurality of contacts respectively connected with said electromagnets, a contact member movable from one contact to another to interchange the connection to said electromagnets, and time controlled means for moving said contact member.

4. In a recording system, a plurality of printing electromagnets, a plurality of contacts respectively connected with said electromagnets, a contact member movable to make consecutive engagement with said contacts, a source of current, a switch, a conductor connecting said contact member with said source of current through said switch, and a conductor connecting the other side of said source of current with said electromagnets.

5. In a recording system, a plurality of printing electromagnets, a plurality of sets of contacts connected with said electromagnets, a contact member for each set movable to make consecutive engagement with said contacts, a spring jack for each set, a selecting plug for connection in said spring jack, and a source of current connected between said plug and said electromagnets.

6. In a recording system, a plurality of printing electromagnets, a plurality of contacts respectively connected with said electromagnets, a contact member movable to make consecutive engagement with said contacts, a conductor connecting said contact member with a source of current through a normally open switch, and a conductor connecting the other side of said source of current with said electromagnets.

7. In a recording system, a clock, an electromagnet, a circuit therefor, means periodically operated by said clock for controlling the circuit of said electromagnet, a series of electromagnetic printing devices, a series of contacts each connected with one terminal of one of said electromagnetic devices, a wiper for said contacts, said wiper being advanced from one of said contacts to the next by the energization of said electromagnet, and means for connecting said wiper to the other terminals of all of said electromagnetic printing devices.

8. In a recording system, an electrically operated accumulator having electrical contacts, a plurality of printing electromagnets controlled by said electrical contacts, an electric circuit for controlling said accumulator, and a manually operated switch for controlling said electric circuit.

9. In a recording system, a plurality of accumulating devices, electromagnetic means for operating each of said devices, electric circuits for said electromagnetic means, said circuits including a time controlled periodically operated switch and a manual switch, a plurality of printing magnets, step by step electric contact mechanism for each accumulating device, and electric circuits between said contact mechanism and said printing electromagnets whereby each engagement places a particular printing electromagnet in circuit.

10. In a recording system, a plurality of circularly arranged contact points, a wiper rotatable to make electrical engagement with any of said contact points, an electromagnet having an armature connected with said wiper, each energization of the electromagnet advancing the wiper one step, a source of current, a circuit including said electromagnetic means and said source of current, a time controlled periodically operated switch and a manual switch connected in said circuit, a printing electromagnet connected with each contact point, and means for connecting the other terminals of said electromagnets with said wiper.

11. In a recording system, a plurality of electromagnets, a clock, contact mechanism periodically operated by said clock, a source of power connected between one side of said contact mechanism and one side of each of said electromagnets, a common wire extending from the other side of said contact mechanism, a switch for independently connecting each of said electromagnets with said common wire, a series of circularly arranged contact points for each electromagnet, a rotatable wiper for electrical engagement with said contact points, an armature for said electromagnet connected with said wiper, each energization of the electromagnet causing the advance of said wiper one step, a contact spring for each wiper, a printing electromagnet connected with each contact point, the other sides of said printing electromagnets being connected by a common conductor, and means for connecting said last-named common conductor with any of said contact springs.

12. In a recording system, an electromagnet, integrating mechanism comprising a plurality of digit members, an armature for said electromagnet mechanically associated with said numbers to advance them, contact mechanism for each of said elements, a plurality of printing electromagnetic devices connected with all of said contact mechanisms, a circuit extending from said printing electromagnetic devices back to the contact mechanism, and electromagnetically operated means in said last-named circuit for determining the position of the printing area for said devices.

13. In a recording system, a plurality of integrating members, electromagnetic means for advancing said members, contact mechanism for each of said elements, a plurality of printing electromagnets, circuits for said printing electromagnets controlled by said contact mechanisms, and a switch for controlling said circuits so as to shift from each of them to the next.

14. In a recording system, a plurality of electromagnets, circuits for said electromagnets having a switch which is periodically operated, manually operated switches for placing any of said electromagnets under the control of said periodically operated switches, integrating mechanism controlled by each of said electromagnets, each of said integrating mechanisms comprising a hundreds element, a tens element, a units element and a fraction element, a plurality of contact points associated with each element, a plurality of printing electromagnets, the corresponding contact points of the three digits elements being connected together and to the corresponding printing electromagnet, a printing electromagnet for each fraction of the fraction element, a rotatable wiper for each element adapted to pass over and make electrical engagement with the contacts, contact mechanism having three contacts, one spring being connected electrically to the hundreds wiper, one to the tens wiper and one to the units wiper, the fraction wiper being connected to the tens contact, three conducting strands for connection with said contact mechanism cord extending from said plug, a shifting electromagnet in the hundreds strand, a shifting electromagnet in the units strand, said strands being then connected together, a source of current between the other terminals of said printing electromagnets and the common point of said strands, and a switch associated with said strands for successively closing the circuits.

15. In a recording system, a plurality of electromagnetic accumulating devices, time controlled contact mechanism, an entrance plate having switches for placing any of said accumulating devices under the control of said time controlled contact mechanism, a printing machine comprising a plurality of printing electromagnets, contact mechanism in said accumulators for controlling said electromagnets, shifting mechanism in said printing machine for determining the printing area of said printing electromagnets, time printing wheels in said printing machine, consecutive numbering wheels in said printing machine, hour location type in said printing machine, platens for said consecutive numbering wheels and time printing wheels and hour location type, an operating electromagnet for bringing said platen down upon the type with which it is associated, and selective electrical connecting means for connecting said printing machine with any of said accumulators.

16. In an accounting system, an electromagnet, a circuit controlling said electromagnet, integrating disks having characters upon the peripheries thereof, an armature for said electromagnet, means operatively connecting said armature and said integrating disks, step-by-step contact mechanism associated with each of said disks, and undivided electromagnetic printing devices, the circuits of which are independently successively selected by said contact mechanism.

17. In recording apparatus, a plurality of type bars, means for operating said type bars, time wheels, means for operating said time wheels, a rising and falling platen, means for operating said platen, ribbon mechanism and paper advancing mechanism operated by said last-named means, and consecutive numbering wheels operated by said last-named means.

In witness whereof, I hereunto subscribe my name this 15th day of July, A. D., 1911.

ALFRED H. SOHM.

Witnesses:
ARTHUR H. BOETTCHER,
ISABEL I. McCANN.

Copies of this patent may be obtained for five cents each, by addressing the "Commissioner of Patents, Washington, D. C."